United States Patent
Yang et al.

(10) Patent No.: US 11,507,782 B2
(45) Date of Patent: Nov. 22, 2022

(54) METHOD, DEVICE, AND PROGRAM PRODUCT FOR DETERMINING MODEL COMPRESSION RATE

(71) Applicant: EMC IP Holding Company LLC, Hopkinton, MA (US)

(72) Inventors: Wenbin Yang, Shanghai (CN); Jinpeng Liu, Shanghai (CN); WuiChak Wong, Xiamen (CN); Sanping Li, Beijing (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 412 days.

(21) Appl. No.: 16/824,834

(22) Filed: Mar. 20, 2020

(65) Prior Publication Data
US 2021/0271932 A1   Sep. 2, 2021

(30) Foreign Application Priority Data
Feb. 27, 2020   (CN) .......................... 202010125822.8

(51) Int. Cl.
*G06K 9/62*   (2022.01)
*G06F 7/556*   (2006.01)
(Continued)

(52) U.S. Cl.
CPC .......... *G06K 9/6262* (2013.01); *G06F 7/556* (2013.01); *G06N 3/082* (2013.01); *G06N 20/00* (2019.01)

(58) Field of Classification Search
CPC .. G06K 9/6262; G06K 9/6263; G06K 9/6264; G06K 9/6265; G06F 7/22;
(Continued)

(56) References Cited

U.S. PATENT DOCUMENTS

2018/0060738 A1* 3/2018 Achin .................... G06N 20/00
2020/0133735 A1* 4/2020 Zhao ...................... G06N 20/00

OTHER PUBLICATIONS

Z. Liu et al., "Learning Efficient Convolutional Networks through Network Slimming," arXiv:1708.06519v1 [cs.CV], Aug. 22, 2017, 10 pages.

* cited by examiner

*Primary Examiner* — Duy M Dang
(74) *Attorney, Agent, or Firm* — Ryan, Mason & Lewis, LLP

(57) ABSTRACT

A method for determining a model compression rate comprises determining a near-zero importance value subset from an importance value set associated with a machine learning model, a corresponding importance value in the importance value set indicating an importance degree of a corresponding input of a processing layer of the machine learning model, importance values in the near-zero importance value subset being closer to zero than other importance values in the importance value set; determining a target importance value from the near-zero importance value subset, the target importance value corresponding to a turning point of a magnitude of the importance values in the near-zero importance value subset; determining a proportion of importance values less than the target importance value in the importance value set in the importance value set; and determining the compression rate for the machine learning model based on the determined proportion.

20 Claims, 9 Drawing Sheets

(51) Int. Cl.
*G06N 20/00* (2019.01)
*G06N 3/08* (2006.01)

(58) Field of Classification Search
CPC ..... G06F 7/24; G06F 7/26; G06F 7/00; G06F 7/544; G06F 7/556; G06N 20/00; G06N 3/082; G06N 3/0454; G06N 3/02; G06N 3/08; G06N 7/00; G06N 7/005
See application file for complete search history.

METHOD, DEVICE, AND PROGRAM PRODUCT FOR DETERMINING MODEL COMPRESSION RATE

RELATED APPLICATION(S)

The present application claims priority to Chinese Patent Application No. 202010125822.8, filed Feb. 27, 2020, and entitled "Method, Device, and Program Product for Determining Model Compression Rate," which is incorporated by reference herein in its entirety.

FIELD

Embodiments of the present disclosure relate to the field of artificial intelligence, and more specifically to a method, an electronic device, and a computer program product for determining a model compression rate.

BACKGROUND

Artificial intelligence technologies have been continuously developed in recent years and have been widely used in different fields and implementations at present. A machine learning model can be designed to implement a variety of artificial intelligence tasks, including computer visual processing, speech recognition, natural language processing, and the like. A trained machine learning model sometimes needs to be deployed in a device with limited processing and/or storage capacity, such as a terminal device or an edge computing device. Execution of machine learning models, especially execution of complex or more precisely configured models, will require relatively great processing and storage resources.

SUMMARY

Embodiments of the present disclosure provide a solution for determining a model compression rate.

In a first aspect of the present disclosure, a method for determining a model compression rate is provided. The method includes determining a near-zero importance value subset from an importance value set associated with a machine learning model, a corresponding importance value in the importance value set indicating an importance degree of a corresponding input of a processing layer of the machine learning model, importance values in the near-zero importance value subset being closer to zero than other importance values in the importance value set; determining a target importance value from the near-zero importance value subset, the target importance value corresponding to a turning point of a magnitude of the importance values in the near-zero importance value subset; determining a proportion of importance values less than the target importance value in the importance value set; and determining the model compression rate for the machine learning model based on the determined proportion.

In a second aspect of the present disclosure, an electronic device is provided. The electronic device includes at least one processor; and at least one memory storing computer program instructions, the at least one memory and the computer program instructions being configured, together with the at least one processor, to cause the electronic device to perform actions for determining a model compression rate. The actions include determining a near-zero importance value subset from an importance value set associated with a machine learning model, importance values in the near-zero importance value subset being closer to zero than other importance values in the importance value set; determining a target importance value from the near-zero importance value subset, the target importance value corresponding to a turning point of a magnitude of the importance values in the near-zero importance value subset; determining a proportion of importance values in the importance value set less than the target importance value in the importance value set; and determining the model compression rate for the machine learning model based on the determined proportion.

In a third aspect of the present disclosure, a computer program product is provided. The computer program product is tangibly stored in a non-volatile computer-readable medium and including machine-executable instructions, the machine-executable instructions, when executed, causing a device to implement the method in the first aspect above.

This Summary section is provided to introduce the selection of concepts in a simplified form, which will be further described in the Detailed Description below. Further, this Summary section is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Figure 1:
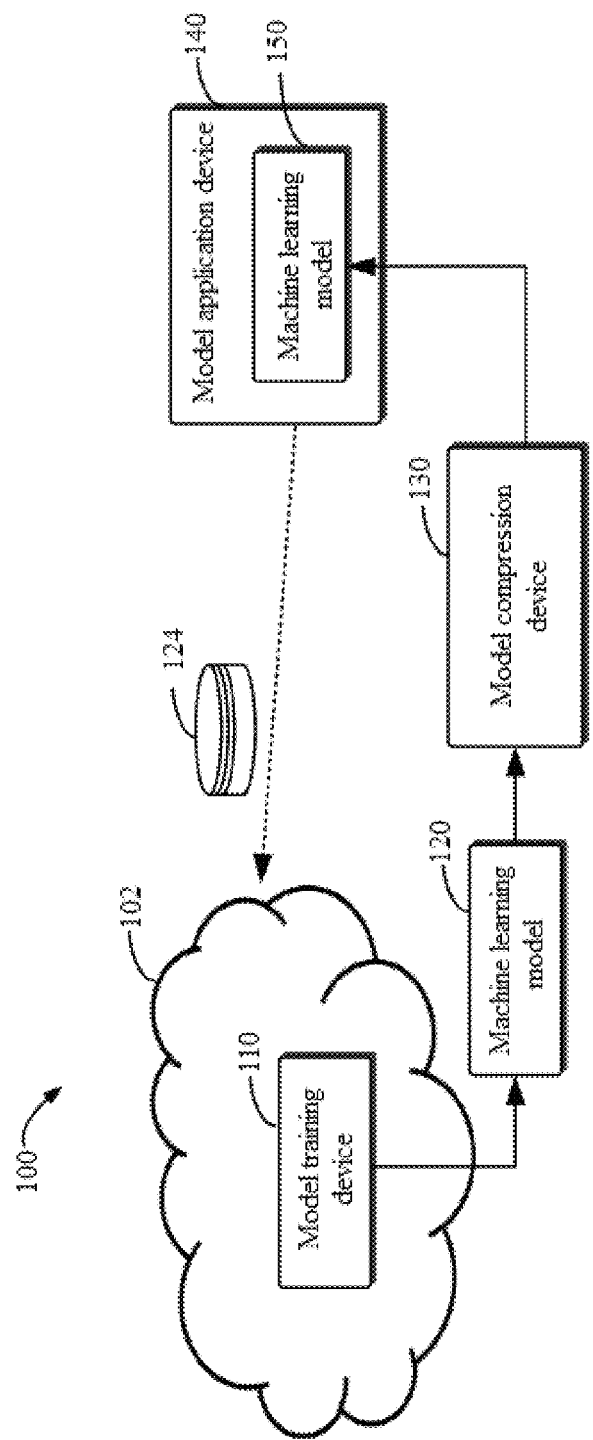
FIG. 1 shows a schematic diagram of an environment in which embodiments of the present disclosure may be implemented.

The principles of the present disclosure will be described below with reference to some example embodiments shown in the accompanying drawings. While illustrative embodiments of the present disclosure are shown in the accompanying drawings, it should be understood that these embodiments are described merely to enable those skilled in the art to better understand and then implement the present disclosure, and are not intended to impose any limitation on the scope of the present disclosure.

The term "including" and variants thereof used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

The term "machine learning" used herein refers to processing involving high-performance computing, machine learning, and an artificial intelligence algorithm. The term "machine learning model" herein may also be referred to as "learning model," "learning network," "network model," or "model." A "neural network" or "neural network model" is a deep learning model. In general, a machine learning model can receive input data and perform predictions and output prediction results based on the input data.

The machine learning model may include a plurality of processing layers, each of which has a plurality of processing units. Sometimes, the processing unit is also referred to as a convolution kernel. In a convolutional layer of a convolutional neural network (CNN), the processing unit is referred to as a convolution kernel or convolution filter. The processing unit in each processing layer executes corresponding changes on inputs of the processing layer based on corresponding parameters. An output of a processing layer is provided as an input of a next processing layer. An input of the first processing layer of the machine learning model is a model input of the machine learning model, and an output of the last processing layer is a model output of the machine learning model. Sometimes, an input of an intermediate processing layer is also referred to as a feature extracted by the machine learning model. Values of all parameters of the processing units of the machine learning model form a parameter value set of the machine learning model.

Machine learning may be mainly divided into three stages, that is, a training stage, a test stage, and an application stage (also referred to as a reasoning stage). In the training stage, a given machine learning model may be trained using a large number of training samples and be iterated continuously until the machine learning model can obtain, from the training samples, consistent reasoning similar to reasoning that can be made by human intelligence. The machine learning model, through training, may be considered as being capable of learning a mapping or association relationship between inputs and outputs from training data. After training, the parameter value set of the machine learning model is determined. In the test stage, the trained machine learning model can be tested with test samples, to determine the performance of the machine learning model. In the application stage, the machine learning model may be configured to process actual input data, based on the parameter value set obtained by training, to give a corresponding output.

The training and execution of the machine learning model both request relatively great computing resources, including processing and storage resources. For complex or more precisely configured models, resource requirements will be higher. The training of the machine learning model may be implemented by a device with more processing and storage resources, such as a cloud computing environment. However, in some cases, the trained machine learning model may need to be deployed in a device with limited resources, such as a user terminal or an edge computing device, for a lot of reasons such as privacy protection, avoiding network dependence, and accelerating response speed. In order to enable the device with limited resources to run the machine learning model, it is presented that compression of the machine learning model may be executed prior to deployment.

FIG. 1 shows a schematic diagram of environment 100 in which embodiments of the present disclosure may be implemented. As shown in FIG. 1, environment 100 includes model training device 110, model compression device 130, and model application device 140.

Model training device 110 is configured to perform model training to generate trained machine learning model 120. Machine learning model 120 may be trained based on training data. Machine learning model 120 may be any model capable of processing inputs and providing corresponding outputs, and can be configured to execute, e.g., computer visual processing, speech processing, and natural language processing, to implement tasks, such as object recognition, exception detection, speech recognition, and classification.

Model training device 110 may have a computing power that can support model training, including corresponding processing and storage resources. In some examples, model training device 110, for example, may be included in computing environment 102, such as a cloud computing environment. In another example, model training device 110 may also be a stand-alone computing device.

Model training device 110 can provide trained machine learning model 120 to model compression device 130. For example, model training device 110 can send a model configuration and a parameter value set obtained by training of machine learning model 120 to model compression device 130. Model compression device 130 is configured to compress machine learning model 120 to reduce a size of machine learning model 120 and obtain compressed machine learning model 150. Compressed machine learning model 150 may be deployed in model application device 140 for implementing corresponding processing.

Model application device 140 may be any computing device with a computing power. In some cases, model application device 140 may be a computing device with limited processing and/or storage resources, for example, user equipment, such as a mobile phone, a laptop computer, a desktop computer, or a tablet computer, or may be another computing terminal, such as an edge computing device or a border gateway of an Internet of things (IoT). In the case where model application device 140 has limited resources, compression of the machine learning model helps to reduce consumption of the computing and/or storage resources in the model application stage.

Model compression device 130 may be any computing device with a computing power, which may be a stand-alone computing device (as shown in the figure) or included in computing environment 102 together with model training device 110.

In some cases, model application device 140 has been deployed with a machine learning model. Deployed machine learning model 150 may be a previous version of a currently trained machine learning module for implementing the same or similar tasks. That is, the machine learning module to be applied to model application device 140 may be continuously iterated and updated. Model application device 140 and/or other data sources can provide training data 124 to computing environment 102, for example, model training device 110 in computing environment 102, to be further configured to support iteration and update of the model. This means that model deployment from model training device 110 to model application device 140 may occur continuously.

Of course, it should be understood that such model iteration and update is only an example. In other examples, machine learning model 120 trained by model training device 110 may be an entirely new model. While only one model application device is shown in FIG. 1, in some examples, compressed machine learning model 150 may be deployed in a plurality of model application devices.

It should be understood that the number and arrangement of devices shown in FIG. 1 are merely illustrative, and should not be construed as limitations to the solution of the present application.

At present, many model compression technologies are used for implementing compression of machine learning models. One model compression technology includes a model pruning technology. The model pruning (sometimes also referred to as network pruning) technology removes or prunes inputs that are considered unimportant in a machine learning model, thereby reducing a model size, especially a parameter value size, because no corresponding parameter values are required to process the inputs. The reducing a model size can further improve a model processing speed. Thus, consumption of both storage resources and processing resources by the compressed machine learning model will be reduced.

Here, a compression rate for compressing the machine learning model reflects a compression degree of the machine learning model, and may be determined as a ratio of a model size after compression to a model size before compression. The lower the compression rate is, the higher the model compression degree is. In a scenario of model pruning, a model pruning rate refers to a ratio of the number of inputs deleted from the machine learning model to a total number of inputs in the machine learning model before the model pruning. The inputs here may include a sum of inputs of a first processing layer and inputs of subsequent processing layers. Therefore, in the scenario of model pruning, the compression rate refers to a ratio of the number of remaining inputs in the machine learning model after model pruning to a total number of inputs in the machine learning model before model pruning. That is, the higher the model pruning rate is, the lower the corresponding compression rate is. The two rates can be converted to each other.

Generally, the more pruned inputs there are, the smaller the size of the compressed machine learning model is, and the faster the model processing speed is. However, the reduction of the model size will lead to the reduction of model performance, thus reducing the model processing accuracy. Therefore, there is a trade-off between the compression rate and model accuracy.

Figure 2:
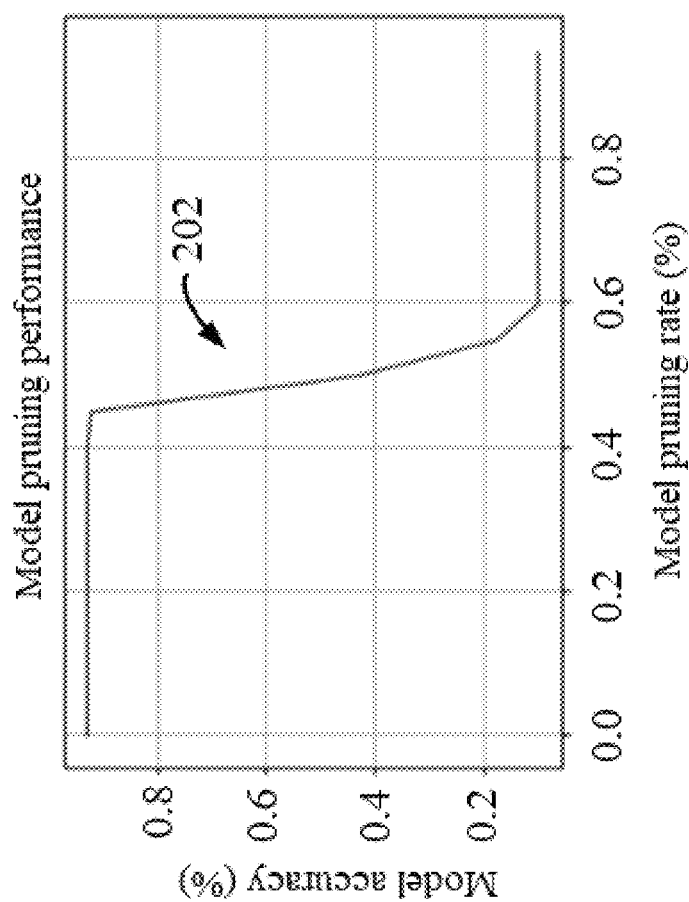
FIG. 2 shows a model pruning performance curve of model accuracy versus model pruning rate.

For a given example machine learning model, FIG. 2 shows a model pruning performance curve 202 of model accuracy vs. model pruning rate. The higher the model pruning rate is, the more inputs deleted from the machine learning model there are, and the lower the compression rate is. It can be seen that the model pruning rate and the corresponding compression rate are not linearly distributed with the accuracy loss. In an example of FIG. 2, the model accuracy declines rapidly after the model pruning rate reaches 40%.

At present, a lot of research focuses on model compression technologies themselves. As for a relationship between the model pruning rate and the accuracy loss, a continuous iterative attempt is adopted in most cases. Each time, the model pruning rate or compression rate is preset manually, and then the accuracy of a compressed machine learning model is determined after executing corresponding model pruning. After each model pruning, it is further necessary to execute retraining and fine tuning processes of the machine learning model. Finally, a better model pruning rate/compression rate is selected by comparing different model pruning rates/compression rates and corresponding accuracies.

According to an embodiment of the present disclosure, a solution for determining a model compression rate is presented. For a given machine learning model, the solution can pre-determine a model compression rate suitable for compressing the machine learning model. In the solution, a target importance value is determined from a near-zero importance value subset in an importance value set associated with the machine learning model, the target importance value corresponding to a turning point of a magnitude of importance values in the near-zero importance value subset. Then, a proportion of importance values in the importance value set less than the target importance value in the importance value set is determined. The model compression rate of the machine learning model is determined based on the determined proportion.

In such a way, an optimal compression rate without compromising model performance can be pre-known without the need of performing a time-consuming training process. Compared with the method that requires repeated training and adjustment to achieve model compression, this solution can execute model compression after extracting the determined optimal compression rate, thus achieving fewer overall resource consumption and lower delay.

Figure 3:
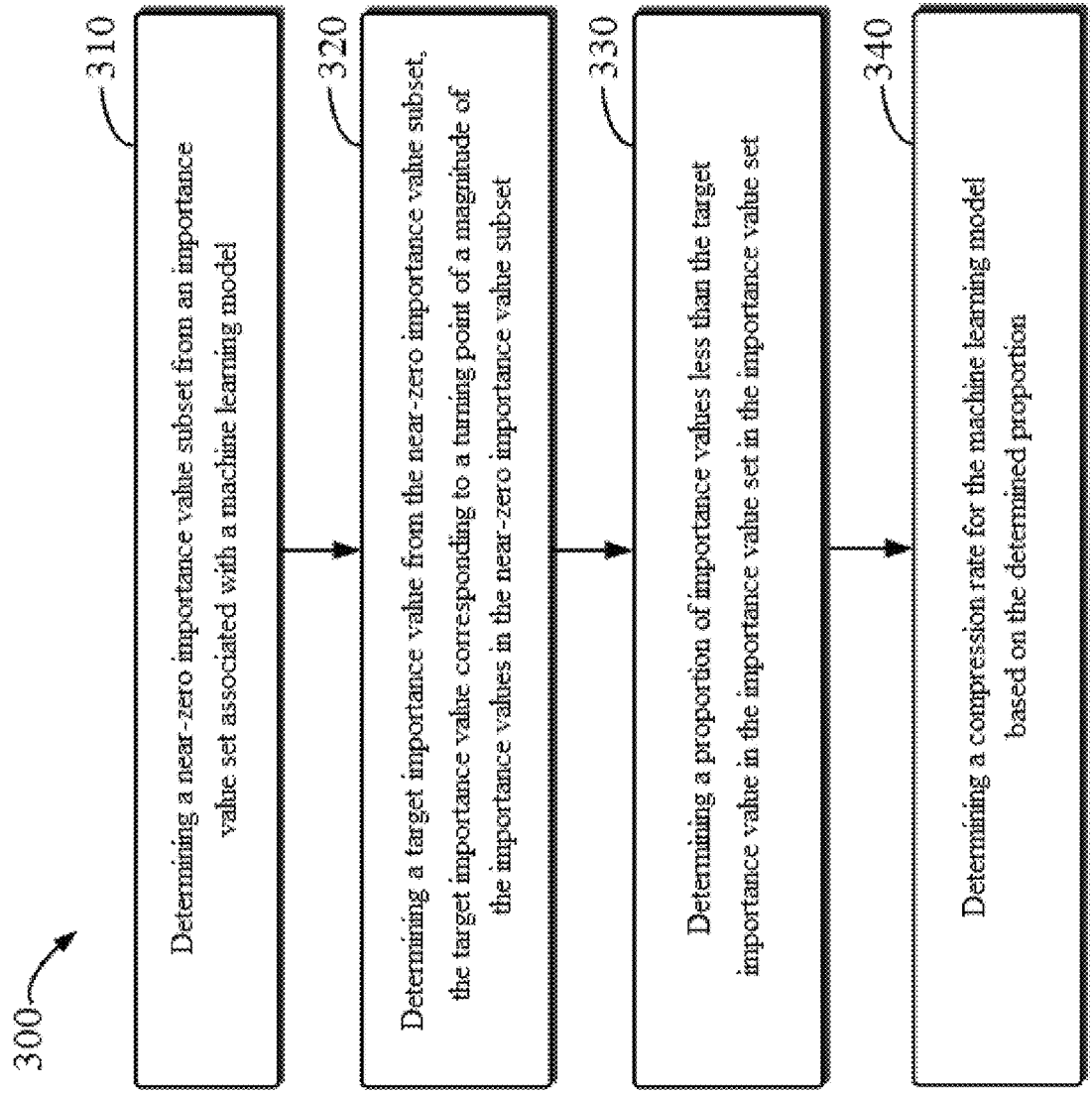
FIG. 3 shows a flowchart of a signaling process for determining a model compression rate according to some embodiments of the present disclosure.

FIG. 3 shows a flowchart of process 300 for determining a model compression rate according to an embodiment of the present disclosure. Process 300 may be implemented by model compression device 130 in FIG. 1.

In 310, model compression device 130 determines a near-zero importance value subset from an importance value set associated with machine learning model 120. A corresponding importance value in the importance value set of machine learning model 120 indicates an importance degree of a corresponding input of a processing layer of machine learning model 120. Machine learning model 120 may be a trained machine learning model with determined importance values.

The importance values can be determined and expressed in many ways. In some embodiments, the importance values include a scaling factor which may be determined in a training process of machine learning model 120. For example, when model training is performed by sparsity regularization, determination of a scaling factor for inputs of the processing layer may be introduced at the same time. In some embodiments, the importance values may also be determined by parameter values, especially weights that are applied to the inputs. For example, the importance values may be determined as absolute values of weight values.

In some embodiments, the importance value set includes importance values corresponding to inputs of each processing layer of machine learning model 120. In an embodiment, inputs of a first processing layer may not be taken into account. Alternatively or additionally, the importance value set includes importance values corresponding to inputs of complex processing layers of machine learning model 120, e.g., inputs of processing layers with more parameter values. Examples of such processing layers, e.g., include a convolutional layer for performing a convolution operation, a fully connected layer, and so on.

Figure 4:
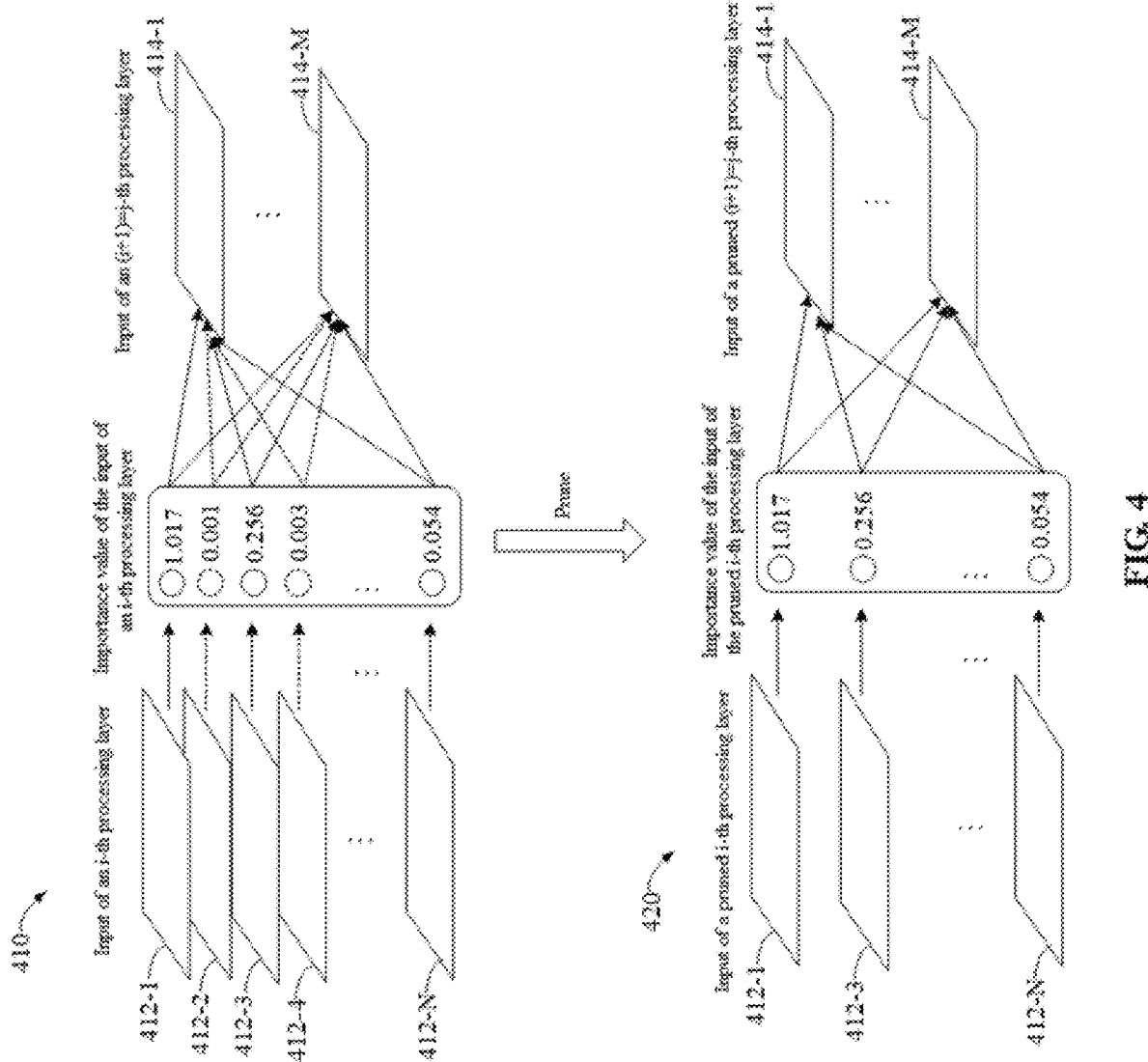
FIG. 4 shows an example of a processing layer and a pruned processing layer of a machine learning model according to some embodiments of the present disclosure.

FIG. 4 shows processing of processing layer 410 of machine learning model 120. As shown in FIG. 4, processing layer 410 needs to process N inputs 412-1 to 412-N (collectively or individually referred to as inputs 412). Inputs 412 may be any to-be-processed data or information. Processing layer 410 has processing units for processing corresponding inputs 412 to obtain corresponding M outputs 414-1 to 414-M (collectively or individually referred to as outputs 414). N and M may be positive integers greater than or equal to 1. Each output 414 is associated with one or more inputs 412. Associated inputs 412 are configured to determine corresponding outputs 414 during model processing. Association between inputs 412 and outputs 414 depends on model configuration. FIG. 4 shows an example of a full connection, in which one output 414 is associated with all inputs 412. In other examples, one output 414 may be associated with one or some inputs 412.

FIG. 4 further shows an importance value corresponding to each input 412. Generally, the greater the importance value of input 412 is, the more important the input 412 is, and in some cases, the more the contributions may be made by said input 412 to output 414 of the processing layer. There are some smaller importance values among the determined importance values, so importance of inputs 412 corresponding to such importance values is lower. FIG. 4 only shows one processing layer 410 of machine learning model 120. Machine learning model 120 may include a plurality of similar processing layers.

Model compression device 130 determines near-zero importance values from the importance value set of machine learning model 120 to form a near-zero importance value subset. The "near-zero" herein means that importance values in the near-zero importance value subset are closer to zero than other importance values in the importance value set. In some embodiments, a threshold may be set, and importance values less than the threshold are included in the near-zero importance value subset. The threshold may be set as a conservative value, such as a relatively large value.

Figure 5A:
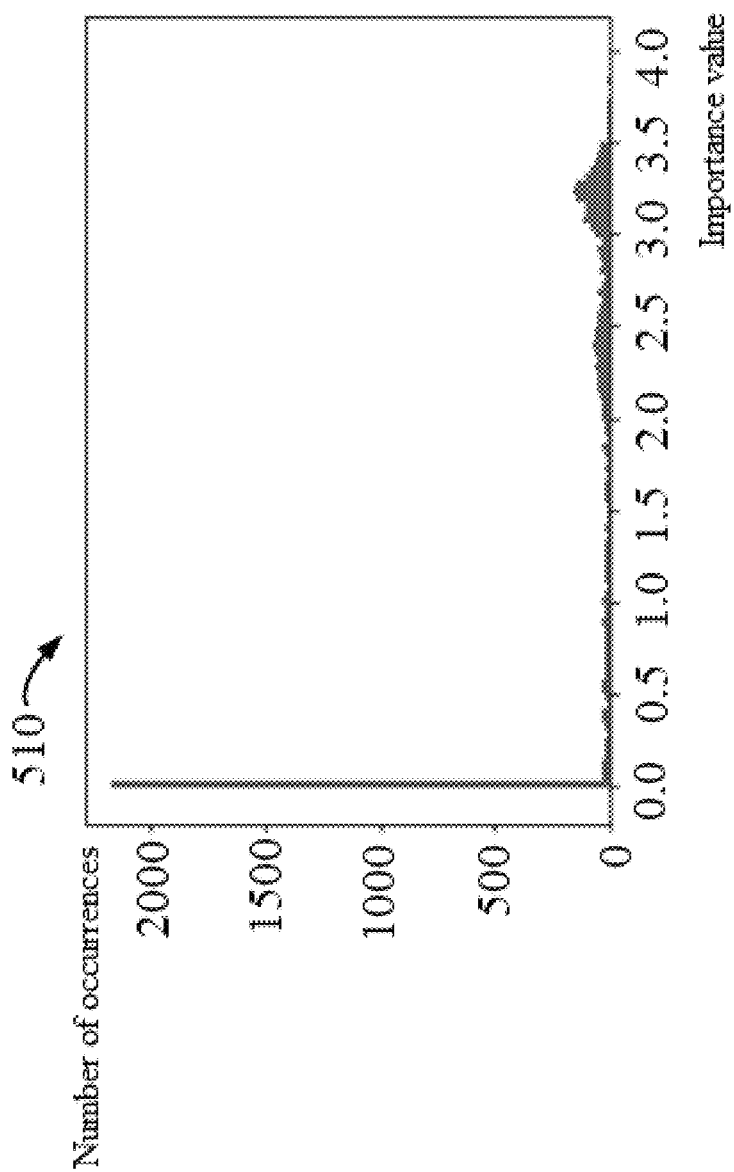
FIG. 5A shows an example of distribution of an importance value set of a machine learning model according to some embodiments of the present disclosure.

In some embodiments, in order to facilitate fast determination of the near-zero importance value subset, model compression device 130 can determine distribution of the importance value set, and determine the near-zero importance value subset based on the distribution. The distribution of the importance value set presents the number of occurrences of a given importance value in the importance value set. FIG. 5A shows example distribution 510 of an importance value set of machine learning model 120. As can be seen from distribution 510, more importance values are at positions close to zero in the importance value set. A threshold close to zero can be determined based on distribution 510, and importance values less than the threshold are included in a near-zero importance value subset.

Further referring to FIG. 3, in 320, model compression device 130 determines a target importance value from the near-zero importance value subset. The target importance value is used for determining a compression rate of model compression device 130 on machine learning model 120. A finally determined compression rate is expected to achieve maximum model compression without causing significant loss of a model accuracy. In an embodiment disclosed herein, the target importance value is determined as a turning point of a magnitude of importance values in the near-zero importance value subset. Such a turning point means that, in the near-zero importance value subset, a change trend of importance values less than the target importance value is steady, while importance values greater than the target importance value start to change significantly.

Since the importance values in the near-zero importance value subset are all relatively close to zero, and the absolute magnitude has no obvious changes, in some embodiments, model compression device 130 can convert the importance values in the near-zero importance value subset into a logarithmic space for analysis. Specifically, model compression device 130 can perform logarithmic transformation on the importance values in the near-zero importance value subset to obtain a corresponding logarithmic transformation value set, which includes a logarithmic transformation value corresponding to each importance value. Logarithmic transformation can increase importance values close to zero, and can also stabilize a variance between the importance values.

An appropriate logarithmic transformation method may be used. In some embodiments, model compression device 130 can use large scale logarithmic projection (LSLP) when performing logarithmic transformation. Specifically, model compression device 130 can first magnify the importance values in the near-zero importance value subset by predetermined times, and then perform logarithmic transformation. In some embodiments, a predetermined offset may be further added to the importance values magnified by the predetermined times, and then logarithmic transformation is performed on the obtained results. The following equation (1) shows an example of performing logarithmic transformation on importance values in the near-zero importance value sub set:

$$\gamma'=\log(M\gamma+\alpha) \qquad \text{Equation (1)}$$

In the equation, γ denotes an importance value, M denotes a magnification factor, α denotes an offset, log ( ) denotes logarithmic transformation, and γ' denotes a logarithmic transformation value. The magnification factor M and the offset a may be predetermined values. Any appropriate base number may be used in logarithmic transformation.

It should be understood that only some examples of logarithmic transformations are provided above. In other embodiments, other logarithmic transformation manners and/or other data transformation manners may also be used.

Figure 5B:
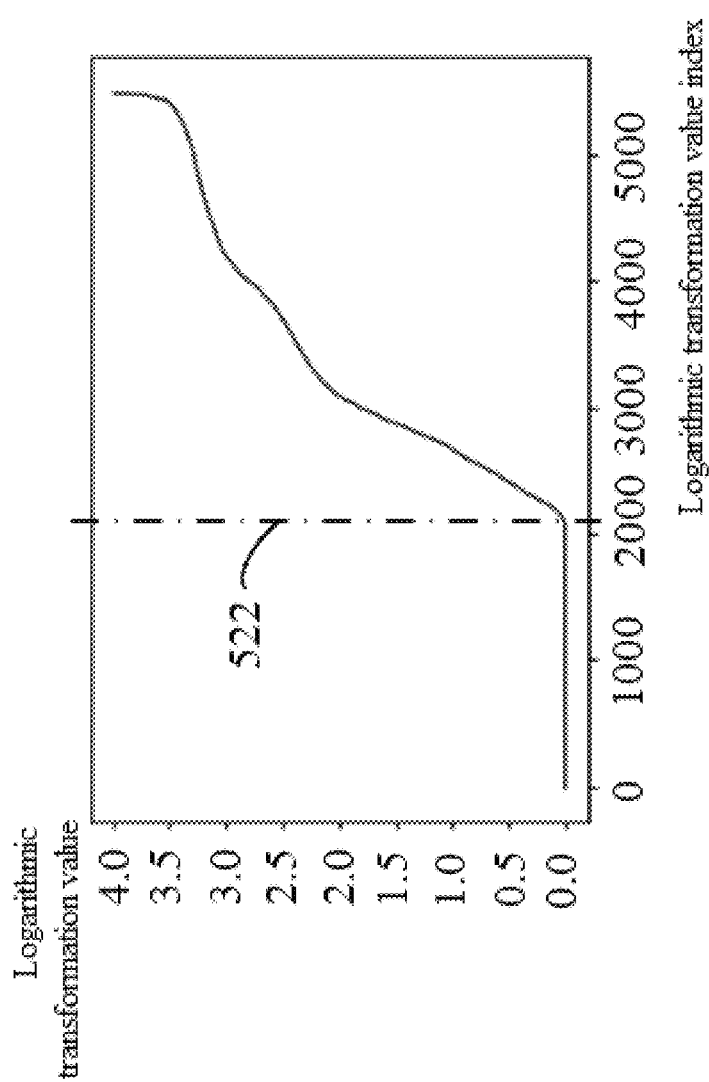
FIG. 5B shows an example of results after performing logarithmic transformation on importance values according to some embodiments of the present disclosure.

In some embodiments, in order to facilitate observation and subsequent processing, model compression device 130 can further sort logarithmic transformation values in the logarithmic transformation value set in ascending or descending order. FIG. 5B shows an example of logarithmic transformation values after performing logarithmic transformation on importance values in a near-zero importance value subset. In the example of FIG. 5B, corresponding logarithmic transformation values are sorted in ascending order and indexed one by one. Each logarithmic transformation value index will be indexed to a logarithmic transformation value. As can be known, each logarithmic transformation value corresponds to an importance value in the near-zero importance value subset.

On the basis of logarithmic transformation, model compression device 130 can determine a target logarithmic transformation value from a logarithmic transformation value set. The target logarithmic transformation value also corresponds to a turning point of a magnitude of the logarithmic transformation values in the logarithmic transformation value set. Such a turning point means that in the logarithmic transformation value set, a change trend of logarithmic transformation values less than the target logarithmic transformation value is steady, while logarithmic transformation values greater than the target logarithmic transformation value start to change significantly. For example, the target logarithmic transformation value may be determined as: among the logarithmic transformation values, a first difference between a first logarithmic transformation value less than the target logarithmic transformation value and a second logarithmic transformation value greater than the logarithmic transformation value being relatively large, and such a first difference may be greater than two differences below: a second difference between two logarithmic transformation values less than the target logarithmic transformation value in the logarithmic transformation value set; and a third difference between two logarithmic transformation values greater than the target logarithmic transformation value in the logarithmic transformation value set. In other words, differences between the target logarithmic transformation value and target logarithmic transformation values before and after are significantly different.

In some embodiments, model compression device 130 can determine a target logarithmic transformation value corresponding to a first of such a turning point from the logarithmic transformation value set. As can be seen from the example of FIG. 5B, the first turning point occurs at dotted line 522, and the turning point approximately corresponds to a logarithmic transformation value of a logarithmic transformation value index close to 2000. It should be understood that if the logarithmic transformation values are sorted in descending order, then model compression device 130 can determine a target logarithmic transformation value corresponding to a last of such a turning point from the logarithmic transformation value set.

Figure 5C:
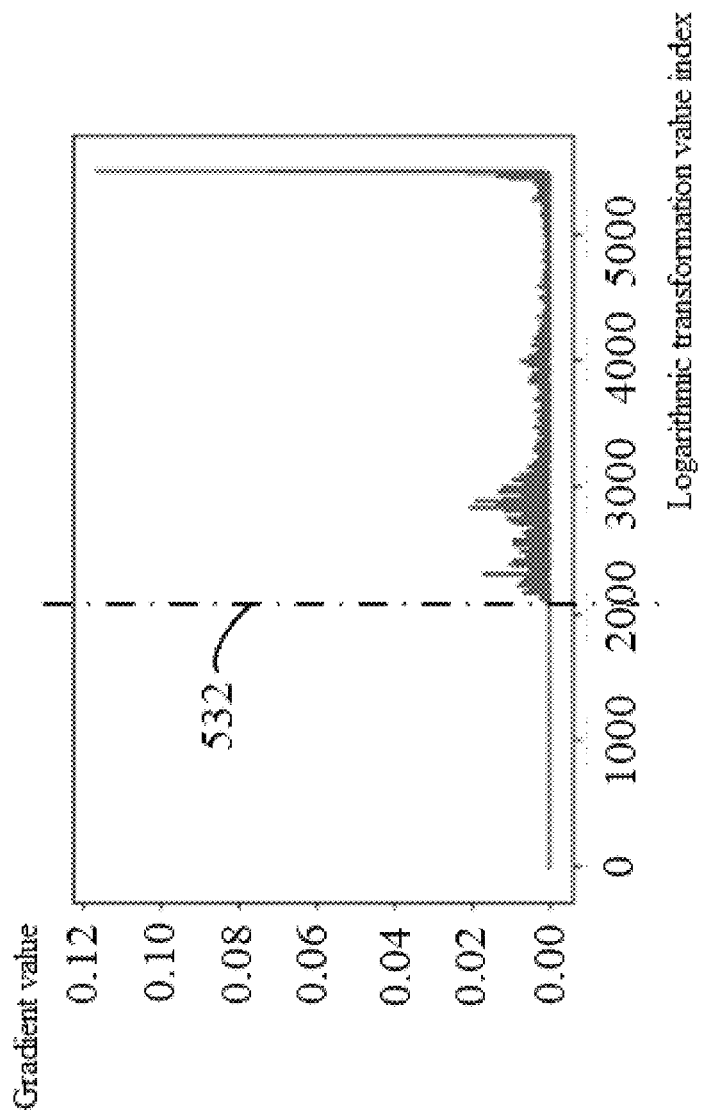
FIG. 5C shows an example of a gradient computing result of logarithmic transformation values according to some embodiments of the present disclosure.

In order to accurately locate a desired target logarithmic transformation value from the logarithmic transformation values set, in some embodiments, model compression device 130 determines a change trend of the sorted logarithmic transformation values, and determines the target logarithmic transformation value corresponding to the turning point based on the determined change trend. The change trend of the logarithmic transformation values may be determined, for example, by calculating gradients of the sorted logarithmic transformation values. For example, FIG. 5C shows calculating gradients for a curve composed of the logarithmic transformation values shown in FIG. 5B to determine gradient values corresponding to the logarithmic transformation values. The gradients indicate a change trend of the corresponding logarithmic transformation values. A turning point, especially a first turning point, for example, at dotted line 532 in FIG. 5C, at which the logarithmic transformation value changes significantly can be seen from the gradient values.

In some embodiments, when locating such a turning point based on the gradient values, model compression device 130 can determine an index of a logarithmic transformation value corresponding to the turning point by using an adaptive threshold segmentation algorithm, and the indexed logarithmic transformation value is determined as a target logarithmic transformation value. The adaptive threshold segmentation algorithm may include, e.g., an adaptive threshold segmentation algorithm based on kernel transformation and any other appropriate threshold segmentation algorithms. The turning point can be located more accurately by using the adaptive threshold segmentation algorithm.

Figure 5D:
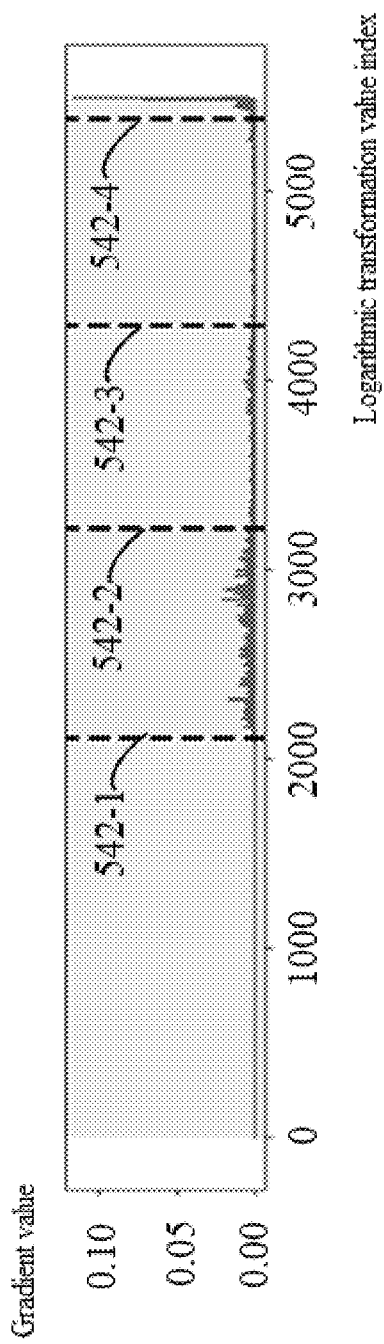
FIG. 5D shows an example of segmentation of gradient values according to some embodiments of the present disclosure.

FIG. 5D shows segmenting gradient values corresponding to logarithmic transformation values into a plurality of segments after application of an adaptive threshold segmentation algorithm. Boundaries of the segments are indicated, e.g., by dashed lines 542-1 to 542-4, respectively. Model compression device 130 can thus determine an upper limit of the smallest segment from the boundaries, such as an upper limit indicated by boundary 542-1. Thus, model compression device 130 can determine a logarithmic transformation value corresponding to a logarithmic transformation value index corresponding to boundary 542-1 as a target logarithmic transformation value, and further determine an importance value corresponding to the target logarithmic transformation value as a target importance value.

In some embodiments, model compression device 130 may not calculate the gradient values, but apply the adaptive threshold segmentation algorithm to logarithmic transformation values, so as to similarly determine the target logarithmic transformation value by segmenting the logarithmic transformation values, and then determine the corresponding target importance value.

After determining the target importance value from the importance value set, in 330 of process 300, model compression device 130 determines a proportion of importance values in the importance value set less than the target importance value in the importance value set. In 340, model compression device 130 determines a model compression rate for machine learning model 120 based on the determined proportion.

After determining the target importance value, a threshold or boundary value corresponding to compression can be determined. Generally, in an example of implementing model compression with a model pruning technology, it is expected to delete inputs of low importance occurring in the machine learning model. Therefore, the proportion of importance values less than the target importance value in all the importance values may correspond to a model pruning rate, i.e., reflecting the proportion of to-be-pruned inputs. Accordingly, the compression rate of machine learning model 120 can be determined as a difference between 100% and the determined proportion.

For example, in the example of FIG. 5D, it is assumed that the determined target logarithmic transformation value is a value with an index of 2115, and the target importance value is also a value with an index of 2115. The importance values less than the target importance value are importance values with index values less than 2115, because the importance values are sorted in ascending order in this example. Thus, assuming that a total number of importance value sets is 5500, it can be determined that the proportion of importance values less than the target importance value in the importance value set is about 38%, which may be considered as the model pruning rate. Accordingly, the compression rate of machine learning model 120 is 72%.

In some embodiments, based on the determined compression rate, model compression device 130 may implement model compression by using the model pruning technology. Therefore, model compression device 130 can determine inputs in machine learning model 120 corresponding to the importance values less than the target importance value. Model compression device 130 can delete parameter values corresponding to the determined inputs from a parameter value set of machine learning model 120. Thus, the parameter value set of machine learning model 120 can be reduced, thereby implementing model compression. In some cases, if inputs to be processed by a processing unit of machine learning model 120 are all deleted, the processing unit can also be deleted.

Further referring to FIG. 4, this figure shows obtaining processing layer 420 after deleting inputs corresponding to smaller importance values (i.e., the importance values less than the target importance value) from processing layer 410. Due to deleting the inputs of the processing layer, corresponding inputs in pruned processing layer 420 do not need to be processed again. For example, inputs 412-2 and 412-4 do not need to be processed. Similar pruning can be performed for each processing layer of machine learning model 120.

In some embodiments, after executing model pruning, machine learning model 120 may be re-trained to implement model fine tuning, thereby obtaining compressed machine learning model 150. Since the compression rate based on which the model compression was previously executed is an automatically determined optimal compression rate, according to the embodiment of the present disclosure, a satisfactory model compression result can be obtained without a plurality of times of repeated iterations of training and compression.

Figure 6:
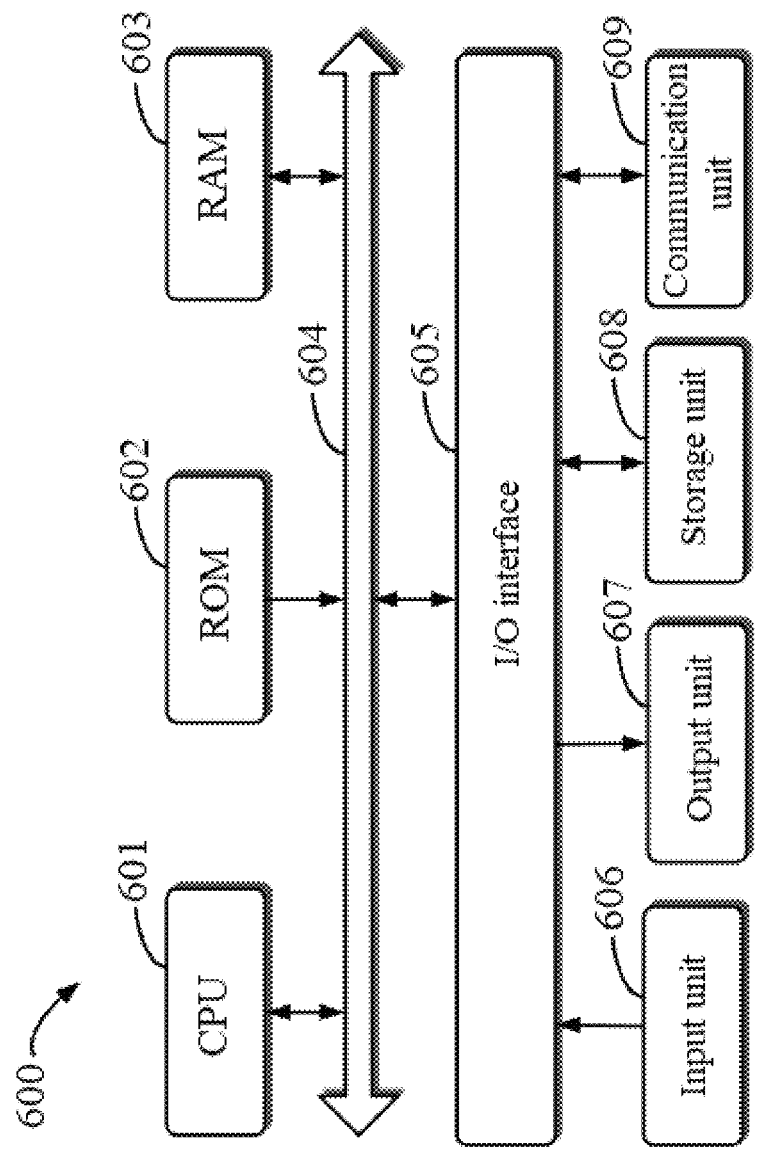
FIG. 6 shows a block diagram of an example device that may be configured to implement embodiments of the present disclosure.

FIG. 6 shows a schematic block diagram of example device 600 that may be configured to implement the embodiments of the present disclosure. Device 600 may be configured to implement process 300 of FIG. 3. Device 600 may be implemented as or included in model compression device 130 of FIG. 1.

As shown in the figure, device 600 includes central processing unit (CPU) 601, which may execute various appropriate actions and processing in accordance with computer program instructions stored in read-only memory (ROM) 602 or computer program instructions loaded onto random access memory (RAM) 603 from storage unit 608. RAM 603 may further store various programs and data required for operations of device 600. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices via a computer network such as the Internet and/or various telecommunication networks.

The processes and processing described above, such as process 300, may be executed by processing unit 601. For example, in some embodiments, process 300 may be embodied as a computer software program or a computer program product that is tangibly included in a machine-readable medium, such as a non-transient computer-readable medium, e.g., storage unit 608. In some embodiments, some of or all the computer program can be loaded into and/or installed onto device 600 via ROM 602 and/or communication unit 609. When the computer program is loaded into RAM 603 and executed by CPU 601, one or more steps of process 300 described above may be executed. Alternatively, in other implementations, CPU 601 may be configured in any other suitable manner (e.g., with the help of firmware) to implement process 300.

Those skilled in the art should understand that the steps of the method of the present disclosure described above may be implemented by a general-purpose computing device, and may be centralized on a single computing device or distributed over a network composed of a plurality of computing devices. Optionally, they may be implemented using program code executable by a computing device, so that they may be stored in a storage apparatus and executed by the computing device, or they may be made into integrated circuit modules respectively, or they may be implemented by making a plurality of modules or steps thereof into a single integrated circuit module. Thus, the present disclosure is not limited to any particular combination of hardware and software.

It should be understood that while some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above can be embodied by further dividing the apparatus into a plurality of apparatuses.

The foregoing description is only optional embodiments of the present disclosure, and is not intended to limit the present disclosure. For those skilled in the art, the present disclosure may be subject to various modifications and alterations. Any modification, equivalent replacement, improvement, and the like made within the spirit and principle of the present disclosure should all be encompassed in the protection scope of the present disclosure.

What is claimed is:

1. A method for determining a model compression rate, comprising:

determining a near-zero importance value subset from an importance value set associated with a machine learning model, a corresponding importance value in the importance value set indicating an importance degree of a corresponding input of a processing layer of the machine learning model, importance values in the near-zero importance value subset being closer to zero than other importance values in the importance value set;

determining a target importance value from the near-zero importance value subset, the target importance value corresponding to a turning point of a magnitude of the importance values in the near-zero importance value subset;

determining a proportion of importance values in the importance value set less than the target importance value in the importance value set; and determining the model compression rate for the machine learning model based on the determined proportion.

2. The method according to claim 1, wherein the determining the near-zero importance value subset comprises:

determining distribution of the importance value set, the distribution presenting a number of occurrences of a given importance value in the importance value set; and determining the near-zero importance value subset based on the distribution.

3. The method according to claim 1, wherein the determining the target importance value comprises:

obtaining a corresponding logarithmic transformation value set by performing logarithmic transformation on the importance values in the near-zero importance value subset;

determining a target logarithmic transformation value from the logarithmic transformation value set, the target logarithmic transformation value corresponding to a turning point of a magnitude of logarithmic transformation values in the logarithmic transformation value set; and determining an importance value in the importance value set corresponding to the target logarithmic transformation value for use as the target importance value.

4. The method according to claim 3, wherein a first difference between a first logarithmic transformation value less than the target logarithmic transformation value and a second logarithmic transformation value greater than the target logarithmic transformation value among the logarithmic transformation values is greater than two differences below:
  a second difference between two logarithmic transformation values less than the target logarithmic transformation value in the logarithmic transformation value set; and
  a third difference between two logarithmic transformation values greater than the target logarithmic transformation value in the logarithmic transformation value set.

5. The method according to claim 3, wherein performing logarithmic transformation comprises utilizing large scale logarithmic projection (LSLP).

6. The method according to claim 3, wherein the determining a target logarithmic transformation value from the logarithmic transformation value set comprises:
  sorting the logarithmic transformation values in the logarithmic transformation value set in ascending or descending order;
  determining a change trend of the sorted logarithmic transformation values; and
  determining the target logarithmic transformation value based on the change trend.

7. The method according to claim 3, wherein the determining a target logarithmic transformation value from the logarithmic transformation value set comprises:
  determining the target logarithmic transformation value based on an adaptive threshold segmentation algorithm.

8. The method according to claim 1, further comprising:
  compressing the machine learning model by model pruning based on the model compression rate.

9. An electronic device, comprising:
  at least one processor; and
  at least one memory storing computer program instructions, the at least one memory and the computer program instructions being configured, together with the at least one processor, to cause the electronic device to perform actions for determining a model compression rate, the actions comprising:
  determining a near-zero importance value subset from an importance value set associated with a machine learning model, a corresponding importance value in the importance value set indicating an importance degree of a corresponding input of a processing layer of the machine learning model, importance values in the near-zero importance value subset being closer to zero than other importance values in the importance value set;
  determining a target importance value from the near-zero importance value subset, the target importance value corresponding to a turning point of a magnitude of the importance values in the near-zero importance value subset;
  determining a proportion of importance values in the importance value set less than the target importance value in the importance value set; and
  determining the model compression rate for the machine learning model based on the determined proportion.

10. The device according to claim 9, wherein the determining the near-zero importance value subset comprises:
  determining distribution of the importance value set, the distribution presenting a number of occurrences of a given importance value in the importance value set; and
  determining the near-zero importance value subset based on the distribution.

11. The device according to claim 9, wherein the determining the target importance value comprises:
  obtaining a corresponding logarithmic transformation value set by performing logarithmic transformation on the importance values in the near-zero importance value subset;
  determining a target logarithmic transformation value from the logarithmic transformation value set, the target logarithmic transformation value corresponding to a turning point of a magnitude of logarithmic transformation values in the logarithmic transformation value set; and
  determining an importance value in the importance value set corresponding to the target logarithmic transformation value for use as the target importance value.

12. The device according to claim 11, wherein a first difference between a first logarithmic transformation value less than the target logarithmic transformation value and a second logarithmic transformation value greater than the logarithmic transformation value among the logarithmic transformation values is greater than two differences below:
  a second difference between two logarithmic transformation values less than the target logarithmic transformation value in the logarithmic transformation value set; and
  a third difference between two logarithmic transformation values greater than the target logarithmic transformation value in the logarithmic transformation value set.

13. The device according to claim 11, wherein performing logarithmic transformation comprises utilizing large scale logarithmic projection (LSLP).

14. The device according to claim 11, wherein the determining a target logarithmic transformation value from the logarithmic transformation value set comprises:
  sorting the logarithmic transformation values in the logarithmic transformation value set in ascending or descending order;
  determining a change trend of the sorted logarithmic transformation values; and
  determining the target logarithmic transformation value based on the change trend.

15. The device according to claim 11, wherein the determining a target logarithmic transformation value from the logarithmic transformation value set comprises:
  determining the target logarithmic transformation value based on an adaptive threshold segmentation algorithm.

16. The device according to claim 9, wherein the actions further comprise:
  compressing the machine learning model by model pruning based on the model compression rate.

17. A computer program product, the computer program product being tangibly stored in a non-volatile computer-readable medium and comprising machine-executable instructions, the machine-executable instructions for determining a model compression rate, when executed by at least one processing device, causing the at least one processing device to:
  determine a near-zero importance value subset from an importance value set associated with a machine learning model, a corresponding importance value in the importance value set indicating an importance degree of a corresponding input of a processing layer of the machine learning model, importance values in the near-zero importance value subset being closer to zero than other importance values in the importance value set;

determine a target importance value from the near-zero importance value subset, the target importance value corresponding to a turning point of a magnitude of the importance values in the near-zero importance value subset;

determine a proportion of importance values in the importance value set less than the target importance value in the importance value set; and determine the model compression rate for the machine learning model based on the determined proportion.

18. The computer program product according to claim 17, wherein the machine-executable instructions, when executed, cause the device to determine the near-zero importance value subset by:

determining distribution of the importance value set, the distribution presenting a number of occurrences of a given importance value in the importance value set; and determining the near-zero importance value subset based on the distribution.

19. The computer program product according to claim 17, wherein the machine-executable instructions, when executed, cause the device to determine the target importance value by:

obtaining a corresponding logarithmic transformation value set by performing logarithmic transformation on the importance values in the near-zero importance value subset;

determining a target logarithmic transformation value from the logarithmic transformation value set, the target logarithmic transformation value corresponding to a turning point of a magnitude of logarithmic transformation values in the logarithmic transformation value set; and determining an importance value in the importance value set corresponding to the target logarithmic transformation value for use as the target importance value.

20. The computer program that according to claim 19, wherein a first difference between a first logarithmic transformation value less than the target logarithmic transformation value and a second logarithmic transformation value greater than the logarithmic transformation value among the logarithmic transformation values is greater than two differences below:

a second difference between two logarithmic transformation values less than the target logarithmic transformation value in the logarithmic transformation value set; and a third difference between two logarithmic transformation values greater than the target logarithmic transformation value in the logarithmic transformation value set.

* * * * *